Nov. 22, 1955  A. R. WHITE  2,724,176
METHOD OF MAKING A COMPRESSIBLE OIL FILTER PACK
Filed Dec. 4, 1951  3 Sheets-Sheet 2
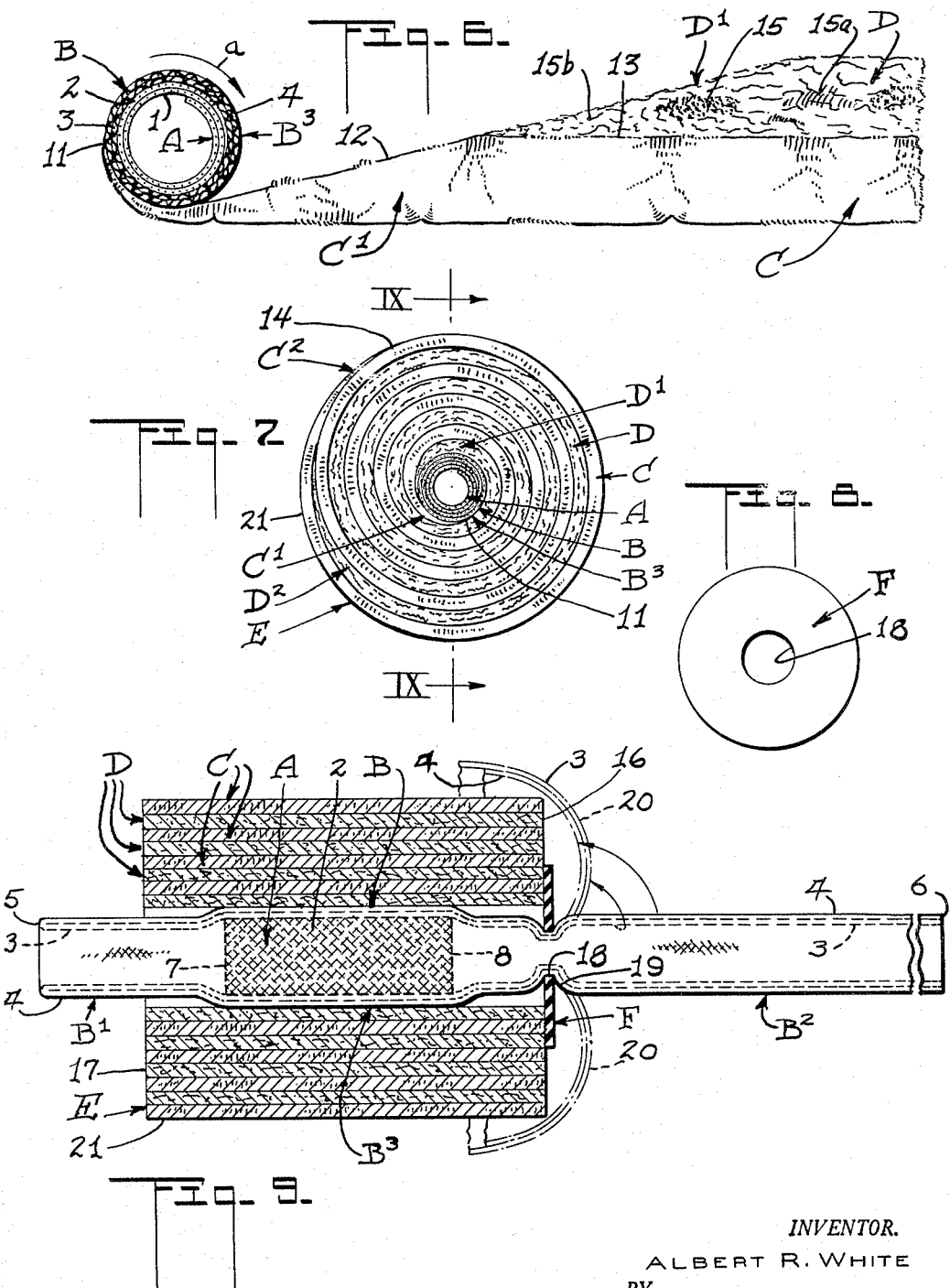
INVENTOR.
ALBERT R. WHITE
BY Munn & Liddy
ATTORNEYS Nov. 22, 1955  A. R. WHITE  2,724,176
METHOD OF MAKING A COMPRESSIBLE OIL FILTER PACK
Filed Dec. 4, 1951  3 Sheets-Sheet 3
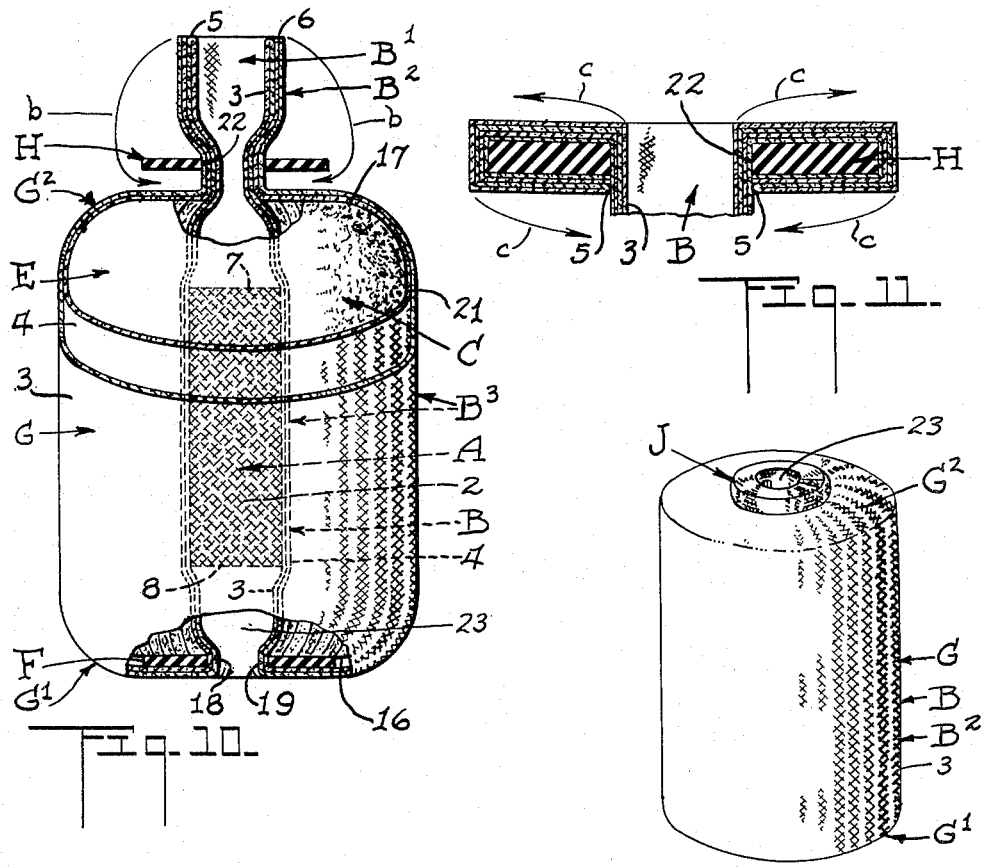
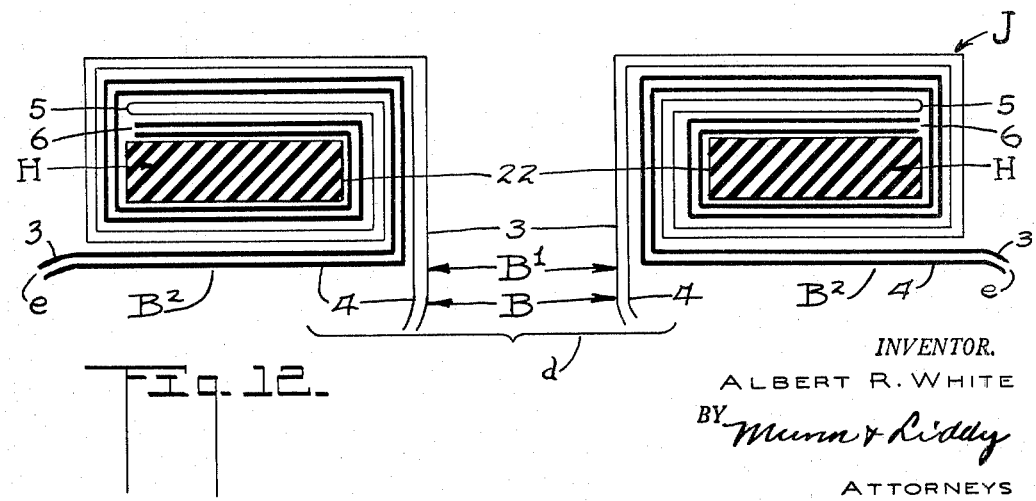
INVENTOR.
ALBERT R. WHITE
BY Munn & Liddy
ATTORNEYS United States Patent Office 2,724,176
Patented Nov. 22, 1955

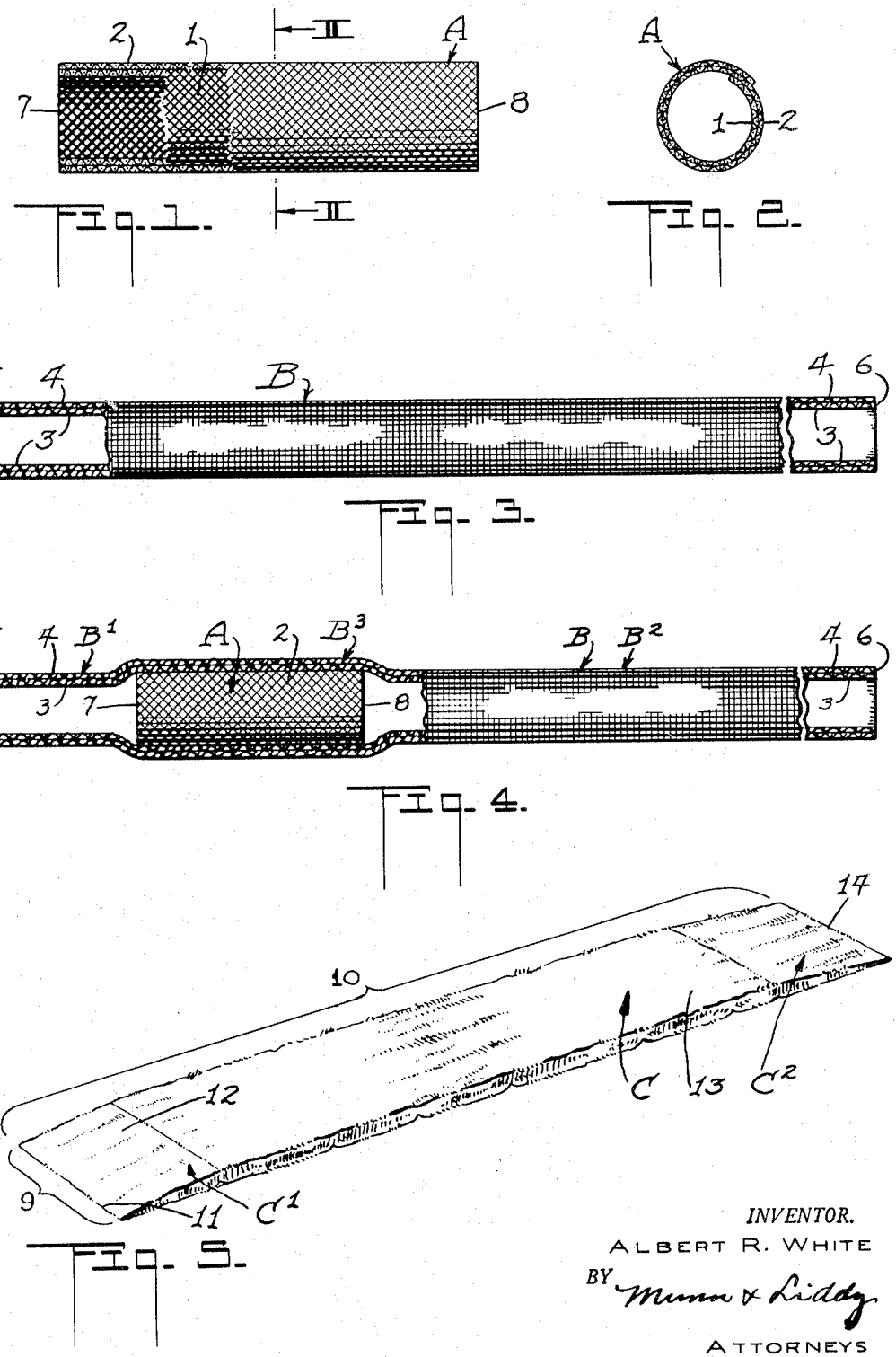

2,724,176
METHOD OF MAKING A COMPRESSIBLE OIL FILTER PACK

Albert R. White, Glendale, Calif.

Application December 4, 1951, Serial No. 259,820

2 Claims. (Cl. 29—419)

In the present invention, I will set forth and claim the various steps carried out in the method of making the compressible oil filter pack disclosed in my copending application, Serial No. 259,819, filed December 4, 1951, now Patent No. 2,675,919. I have illustrated, described and claimed the compressible oil filter pack in the copending case.

The usual oil filter packs make use of permanently formed hard cork gaskets and when such an oil filter pack is mounted on a central tube in an oil filter casing, there will be a considerable by-passing of the oil around the filter pack because the permanently formed hard cork gaskets do not provide a sufficient oil seal to prevent this by-passing.

An object of my invention is to provide an oil filter pack in which resilient washers are placed at each end of the pack for forming an internal oil seal on the central tube which will prevent the by-passing of oil around the pack. In addition, the resilient washers act as bearing washers for the pack and one of them is used as a fastening member for securing the covering member for the oil filter pack in place.

The filtering material in the usual oil filter pack is of the same type throughout the pack body. In my improved compressible pack, the body is composed of alternate layers of fine and coarse filtering material wound spirally around a central tubular core of wire screening. The coarser filtering and absorbent material will screen out and retain the larger particles of foreign matter in the oil while the finer filtering material will screen out and retain the smaller particles of filtering material. A succession of filtering stages for the oil is provided by this unique arrangement of alternate fine and coarse layers of filtering material.

A further object of my invention is to provide a method of making an oil filter pack in which a continuous tubular webbing is used and has a portion interposed between the tubular screen core and the pack body and a second integral portion stretched back over the outer surface of the pack body so that the free end of the second integral portion will enclose the free end of the first mentioned portion. The two ends are secured together.

Other objects and advantages will appear in the following specification, and the novel features of the device will be particularly pointed out in the appended claims.

My invention is illustrated in the accompanying drawings forming a part of this application, in which:

Figure 1 is a front elevation of the tubular wire screen core used in forming the pack, portions being shown in section;

Figure 2 is a transverse section through the core taken along the line II—II of Figure 1 and illustrates how the core may be formed by spirally winding the screen to form two layers;

Figure 3 is a front elevation of the tubular webbing used, the ends of the tubular webbing being shown in section to illustrate how it is composed of two layers formed from a single length of webbing folded back upon itself;

Figure 4 illustrates the position occupied by the core within the tubular webbing so that one end of the tube projects a short distance beyond the adjacent end of the core, while the other end of the tube projects a much greater distance beyond the adjacent end of the core;

Figure 5 is a perspective view of a continuous layer of filtering material which has been cut and shaped to form the body of an oil filtering pack of a predetermined size and shape;

Figure 6 is an enlarged end view of the wire screen core mounted within the tubular webbing and illustrates how the core can be rotated for winding the layer of filtering material therearound. In addition an auxiliary layer of coarser and discontinuous filtering material has been laid upon the first layer of continuous material and the auxiliary layer will form an alternate layer of coarser filtering material within the pack body;

Figure 7 is an end view illustrating the two layers of coarse and fine filtering material wrapped spirally around the core and separated therefrom by the double layer of tubular webbing;

Figure 8 is a plan view of an oil seal washer and two of these are used in the filter pack;

Figure 9 is a section taken substantially along the line IX—IX of Figure 7 and indicates the step of applying an oil seal washer over the longer end of the tubular webbing and the further step of stretching and pulling this longer end back ofer the filter pack body so that the tubular webbing will completely enclose the body;

Figure 10 is an elevational view partly in section illustrating the long end of the tubular webbing now enclosing the shorter exposed end of the tubular webbing, both ends being shown as extending through a second oil seal washer;

Figure 11 is an enlarged view illustrating how the two ends of the tubular webbing illustrated in Figure 10 are initially wrapped around the second oil seal washer to form four layers of material;

Figure 12 is a greatly enlarged schematic view in which the two ends of the tubular webbing are shown wrapped around the second oil seal washer a second time in order to provide eight layers of webbing, the washer thus being locked in position and completing the formation of the oil filter pack without the necessity of any auxiliary fastening means being necessary; and Figure 13 is a perspective view of the completed oil filter pack.

While I have shown only the preferred form of my invention, it should be understood that various changes or modifications may be made within the scope of the appended claims without departing from the spirit and scope of the invention.

In carrying out my invention, I provide a core indicated generally at A and preferably made from wire screening. The core is rolled from a sheet of wire screening that has been cut to the proper dimensions so that the rolled core will have two layers of screening, an inner layer being indicated at 1 and an outer layer at 2. The diameter of the core as well as its length will depend upon the size of the oil filter pack desired. I do not wish to be confined to any particular core diameter, nor to any prescribed length for the core, because filter packs of all sizes and shapes are required and the dimensions of the cores will be determined after noting the size of the filter pack that is to be constructed. The core A has an inside diameter large enough to be slipped over an oil conveying tube, not shown, that is normally provided within the usual oil filter casing. The forming of the wire screen core A is the first step in the method.

I then provide a tubular webbing B, see Figure 3, and form it into an inner layer 3 and an outer layer 4 as the second step in the method, see Figure 3. The tubular webbing B is preferably made from a single length of tubular webbing that is folded back on itself at 5 to form the two layers 3 and 4. The two layers of the tubular webbing B are coextensive in length. The folded end is indicated at 5 while the other end is shown at 6 in Figure 3.

The third step in my method is the placing of the wire screen core A within the tubular webbing B and at the proper place in the webbing. This is illustrated in Figure 4 and it will be noted that the wire screen cylindrical core A is positioned nearer the folded end 5 of the webbing and is much further removed from the other end 6 of the webbing. As a result, a short end B1 of the tubular webbing B extends beyond the adjacent end 7 of the core A and a longer end B2 of the tubular webbing extends beyond the other end 8 of the core A.

The exact position occupied by the core A within the tubular webbing B is important for the correct forming of the filter pack. The normal unstretched diameter of the tubular webbing B is preferably less than the outer diameter of the core A so that the portion of the tubular webbing B3 that contains the core A will be stretched to a greater diameter than the unstretched end portions B1 and B2. It should be understood that the tubular webbing B is of such structure that it can be stretched to a far greater diameter than its normal unstretched diameter.

The fourth step in constructing the filter pack is to take a piece of filtering material C, such as a layer of cotton, see Figure 5, which has good filtering qualities for oil and cut it to the required size. The width of this layer of filtering material is indicated at 9 and its length is indicated at 10. The layer of cotton is preferably two inches thick. All dimensions of the layer will vary according to the size of the oil filtering pack that is to be made. At the end 11 of the layer of filtering material C, I provide a chamfered or inclined surface 12 that extends from the edge 11 up to the upper surface 13 of the layer, and this provides the filtering material C with a wedge-shaped end C1. The other end of the layer of filtering material C is likewise made wedge-shaped as at C2, and this extends from the opposite end 14 of the layer.

The fifth step of my method is to apply an auxiliary layer of loose or coarse filtering material D to the upper surface 13 of the layer C that lies between the chamfered ends C1 and C2 of the layer C. This last filtering material is preferably formed from pieces of cotton, various sized pieces of thicknesses of paper and pieces of string from waste. This auxiliary layer of course material is designed to catch and retain foreign substances from the oil that are larger in size. The auxiliary layer D is not only coextensive in length with the length of the upper surface 13 of the layer C shown in Figure 5, but in addition the ends of the auxiliary filtering layer D are chamfered at D1 and D2, see Figure 7, so as to be a continuation of the chamfered ends C1 and C2 of the filtering strip C. In Figure 6, the pieces of cotton in the layer D are shown at 15, the coarsely ground or flaked paper is shown at 15a, and the cotton threads are indicated at 15b.

The sixth step in the process is to wrap the layer of fine filtering material C and the layer of course filtering material D, around the core A and tubular webbing B as shown in Figures 5, 7 and 9. In Figure 6, I show the enlarged central core A and tubular webbing B placed upon the wedge-shaped end C1 of the layer C. The arrow a in Figure 6 indicates the direction of rotation of the core A to wrap the two layers C and D therearound. The end 11 of the layer C is shown started around the tubular webbing B.

Figure 7 illustrates the completion of the sixth step where the two layers of filtering material C and D have been wrapped around the two layers of tubular webbing B. The position of the core A within the wound filter strips C and D is illustrated in Figure 9 and it will be seen that the core A is centrally disposed with respect to the ends 16 and 17 of the rolled filter pack body layers C and D. The end 16 of the rolled pack body E will be as far removed from the adjacent end 8 of the screen core A as will be the end 17 of the pack body E from the adjacent end 7 of the core.

The seventh step includes the passing of a neoprene washer F over the longer end B2 of the tubular webbing B and moving this washer until it strikes the end 16 of the rolled pack body E, see Figure 9. The opening 18 in the washer F, see also Figure 8, is smaller in diameter than the normal diameter of the tubular webbing B and therefore the longer end B2 will be constricted as at 19, see Figure 9. In actual practice, the opening 18 in the washer F will be of a size small enough that will tend to grip the central oil conveying tube, not shown, when the completed pack body is mounted in an oil filter casing. In this way the neoprene washer will act as an oil seal for the lower end of the pack body, and will cause the oil to pass through the pack body E for filtering purposes rather than be by-passed around the pack.

It will further be noted from Figure 9 that the longer tubular end B2 of the webbing B is turned inside out as indicated by the dot dash lines 20 in Figure 9, and this reversed end is greatly expanded and pulled back over the end 16 and outer cylindrical surface 21 of the rolled pack E. The tubular end B2 is long enough and it will have sufficient expansion qualities to permit the two layers 3 and 4 to be drawn over the outer surface of the pack body E and entirely enclose it as shown in Figure 10. This pulling of the long end B2 back over the pack body E constitutes the eighth step in the method of making the pack body.

The two layers 3 and 4 of the long end B2 will also enclose the end 17 of the pack body E, see Figure 10, and then the remaining portion of the end B2 will enclose the exposed portion of the shorter end B1 of the tubular member. The end 6 of the tubular member shown at Figure 4 and also Figure 10, will therefore terminate at the folded end 5 when the longer end B2 has been drawn back over the outer surface of the pack E as indicated. The neoprene washer F will form an inner oil seal for the base of the pack and it will be entirely enclosed by the tubular end B2. The circumferential edge of the end 16 of the pack body E will be constricted so as to form a rounded corner at G1, see Figure 10. The longer tubular end B2 will likewise compress the circumferential edge of the opposite end 17 of the filter pack body E and this will form a top rounded corner G2.

There remains now only the final or ninth step of securing the coextensive ends B1 and B2 that project above the top G2 of the pack body G together, and this will complete the forming of the oil filter pack. I accomplish this in a unique manner by first slipping a second neoprene washer H over the projecting and telescoped portions of the coextensive tubular ends B1 and B2. This is indicated in Figure 10 and it will be seen that the washer is not moved down into contact with the outer surface of the top rounded portion G2 of the pack. Arrows b in Figure 10 illustrate how the juxtaposed ends 5 and 6 of the tubular member B are brought down around the washer H. The enlarged sectional view in Figure 11 shows the completion of the final step of securing the ends 5 and 6 of the tubular member B to the washer H.

I have indicated four layers of the tubular webbing enclosing the washer H in Figure 11. Since the tubular ends 5 and 6 are folded outwardly and back when enclosing the washer H, the folded end 5 of the tubular webbing B will be at the place indicated in Figure 11 and the end 6 will underlie the folded end 5. The washer H is flexible enough to be turned inside out after the ends 5 and 6 of the tubular member B are passed around the washer to enclose it. Arrows c in Figure 11 indicate how the washer may be turned inside out and this will wrap the tubular member around the washer and add four more layers, making eight layers of thickness in all that enclose the washer.

I have taken the liberty of showing this final folding operation schematically in Figure 12. The two light lines starting at the bracket indicated at *d* in this figure represent the exposed shorter end B1 of the tubular member of double thickness. The two heavy lines originating at the place *e* in Figure 12, represent the portion of the longer tubular end B2 that has been stretched over the pack body E and enclose the end 17 of the body. Both the heavy and the light lines are spaced from each other for the purpose of clarity and each line represents one layer of the tubular webbing.

When the neoprene washer H is turned inside out from the position shown in Figure 11 into that shown in Figure 12, the folded end 5 of the tubular member will occupy the position illustrated in Figure 12 and the ends 6 of the layers 3 and 4 will be disposed adjacent to the folded end 5. The neoprene washer H will have enough elasticity to retain the layers of fabric in folded position without any need of an auxiliary fastening means. The result is the formation of a cloth covered button indicated generally at J in Figure 13 and this button will act as the final fastening means for the completed pack G. From actual experience, I have found that the button J will not become loosened through use. In fact, the button will constitute a novel type of handle or protuberance which may be grasped when moving the pack from place to place. The neoprene washer H has a central opening 22 that is small enough in size to have its rim yieldingly grip the oil conveying pipe, not shown, which is centrally disposed in the usual oil filter casing. The completed pack G will have a longitudinally extending bore 23 that is centrally disposed in the pack and extends from one end of the pack to the other.

The neoprene washer F acts as a bottom bearing washer in the completed pack G as well as an oil seal. Any flexible washer that will not deteriorate when subjected to oil, can be used as washers F and H. I have found that a washer made from neoprene is excellent for this purpose. Neoprene is a synthetic rubberlike plastic formed by the polymerization of chloroprene. The core A may be made from a woven wire cloth.

The button J with its washer H provides an external and yet an integral oil seal as well as a top bearing washer. The washer grips the central oil pipe, not shown, and thus constitutes an oil seal. Superior filtering materials in the element body E are used and these are the layer C of cotton and the auxiliary layer D consisting of pieces of cotton, cotton threads in the form of waste and flakelike or water-like particles of paper varying slightly in thickness from tissue-like thickness to a heavier gauge. The various materials forming the auxiliary filtering layer D are mixed together as a mass and the layer of cotton C acts as a support for the layer D during the winding of the two layers about the core A and the tubular member B. The machine disclosed and claimed in my Patent No. 2,471,595, issued May 31, 1949, may be used in rolling the layers C and D about the core and forming the present pack body E. The title of the patent just mentioned is "Machine and Method of Making an Oil Filter Pack."

The pack body E will be composed of successive layers of fine filtering material C and coarser filtering material D. The pack body E will therefore offer successive stages of filtration to the oil and not a passing of the oil through a back body comprising only one material. The passing of the oil through one layer of cotton C and then through a layer D of the combined filtering mass above mentioned, results in good filtration and cleaning of the oil. If then the oil is passed through a succession of stages of layers C and D, say three or more, a better cleaning and more remarkable results are achieved.

The completed oil filter pack G has no visible ends of material which must be secured in place. The tubular webbing B is continuous from the end 5 to the end 6. A part of the webbing covers the inner cylindrical surface of the pack E and another part covers the outer cylindrical surface of the same pack body E. The two ends 5 and 6 of the tubular webbing are then concealed and secured in place by the washer H and the formation of the button J. The button J can be grasped when moving the pack G. It also acts as a top bearing washer and as an oil seal when the pack is mounted in a filter casing and the central oil tube in the casing extends up through the bore 23 of the pack. The button J therefore serves several functions in that it acts as a fastener element for the ends of the tubular webbing B and it also serves as a handle, an oil seal and a bearing washer.

There are no loose ends of the tubular webbing B located inside of the pack G. The completed pack is designed to be compressed about one inch when placed in an oil filter casing and to expand laterally so as to fill the casing with filtering material.

The novel method of making the pack, disposes the two oil seal washers F and H, external of the pack body E composed of the successive layers C and D of filtering material. Yet the two washers become substantially a part of the pack body after the filter is mounted in the filter casing and is compressed by the securing of the cover to the casing. The two washers give support to both ends of the pack. The oil filter pack G is built to be longer than the length of the oil filter casing so that the pack will be compressed when mounted in the casing.

I claim:

1. The herein described method of making a compressible oil filter pack which comprises: placing a cylindrical screen core within a tubular webbing so that a short length of the tubular webbing extends beyond one end of the core and a long length extends beyond the other core end; wrapping a layer of filtering material around that portion of the tubular webbing occupied by the core to form an oil filtering body; turning the long tubular length inside out and stretching it over the body, the extremity of the long tubular length extending beyond the body and enclosing the short tubular length; passing a washer over the telescoped portions of the tubular webbing; turning the telescoped portions of the tubular webbing inside out and wrapping them around the washer for securing the telescoped portions together and enclosing the washer in the webbing and forming a hand-gripping member exterior of the oil filtering body.

2. The herein described method of making a compressible filter pack which comprises: placing a cylindrical screen core within a tubular webbing so that a short length of the tubular webbing extends beyond one end of the core and a long length extends beyond the other core end; placing filtering material around that portion of the tubular webbing occupied by the core to form an oil filtering body; passing a wide flat washer over the long tubular length webbing until it abuts the adjacent end of the oil filtering body; turning the long tubular length inside out and stretching it over the washer and body so as to enclose both; the extremity of the long tubular length extending beyond the top of the body and enclosing the short tubular length; passing a second wide flat washer over both the telescoped ends of the tubular webbing; and turning the telescoped portions inside out and wrapping them around the second washer for securing the second washer to the tubular webbing and for bringing the second washer adjacent to the oil filtering body for forming a hand-gripping member that is disposed exterior of the oil filtering body.

References Cited in the file of this patent

UNITED STATES PATENTS

| | | |
|---|---|---|
| 1,608,206 | Freedlander | Nov. 23, 1926 |
| 2,173,978 | Pennebaker | Sept. 26, 1939 |
| 2,314,640 | Winslow | Mar. 23, 1943 |
| 2,394,895 | Burhans | Feb. 12, 1946 |
| 2,463,137 | Balke | Mar. 1, 1949 |
| 2,476,817 | Charnes | July 19, 1949 |
| 2,512,797 | Harvuot | June 27, 1950 |